US009376513B2

(12) United States Patent
Tan et al.

(10) Patent No.: US 9,376,513 B2
(45) Date of Patent: Jun. 28, 2016

(54) SOLID CATALYST COMPONENT AND CATALYST FOR OLEFIN POLYMERIZATION

(75) Inventors: Zhong Tan, Beijing (CN); Lunjia Xie, Beijing (CN); Xiudong Xu, Beijing (CN); Yu Tian, Beijing (CN); Qilong Zhou, Beijing (CN); Zaixing Feng, Beijing (CN); Li'an Yan, Beijing (CN); Siyuan Zhao, Beijing (CN); Jinhua Yu, Beijing (CN); Zhufang Sun, Beijing (CN); Fengkui Li, Beijing (CN); Shanshan Yin, Beijing (CN); Weiwei Song, Beijing (CN)

(73) Assignees: China Petroleum & Chemical Corporation, Beijing (CN); Beijing Research Institute of Chemical Industry, China Petroleum & Chemical Corporation, Beijing (CN)

( * ) Notice: Subject to any disclaimer, the term of this patent is extended or adjusted under 35 U.S.C. 154(b) by 340 days.

(21) Appl. No.: 13/980,359

(22) PCT Filed: Jan. 19, 2012

(86) PCT No.: PCT/CN2012/000098
§ 371 (c)(1),
(2), (4) Date: Aug. 21, 2013

(87) PCT Pub. No.: WO2012/097680
PCT Pub. Date: Jul. 26, 2012

(65) Prior Publication Data
US 2013/0324682 A1    Dec. 5, 2013

(30) Foreign Application Priority Data

Jan. 19, 2011  (CN) .......................... 2011 1 0021246
Jan. 19, 2011  (CN) .......................... 2011 1 0021247
Jan. 19, 2011  (CN) .......................... 2011 1 0021250

(51) Int. Cl.
*C08F 110/06* (2006.01)
*C08F 10/06* (2006.01)

(52) U.S. Cl.
CPC ............... *C08F 110/06* (2013.01); *C08F 10/06* (2013.01)

(58) Field of Classification Search
CPC ............................... C08F 110/06; C08F 10/06
See application file for complete search history.

(56) References Cited

U.S. PATENT DOCUMENTS

| 4,784,983 | A | 11/1988 | Mao et al. | |
|---|---|---|---|---|
| 9,068,028 | B2* | 6/2015 | Collina et al. | |
| 2009/0209706 | A1* | 8/2009 | Sheard et al. | 525/240 |
| 2011/0213106 | A1* | 9/2011 | Chang | 526/110 |
| 2012/0046490 | A1* | 2/2012 | Xie et al. | 558/378 |

FOREIGN PATENT DOCUMENTS

| CN | 85100997 A | 1/1987 |
|---|---|---|
| CN | 1062523 A | 7/1992 |
| CN | 1453298 A | 11/2003 |
| CN | 101054424 A | 10/2007 |
| CN | 101165073 A | 4/2008 |
| CN | 101811982 A | 8/2010 |
| CN | 101811983 A | 8/2010 |
| CN | 102453150 A | 5/2012 |
| EP | 0 459 009 A2 | 12/1991 |
| EP | 0 487 035 B1 | 5/1996 |
| EP | 0 811 639 A1 | 12/1997 |
| EP | 1 840 138 A1 | 10/2007 |
| EP | 1 908 767 A1 | 4/2008 |
| EP | 2 399 902 A1 | 12/2011 |
| WO | WO 2010/094211 A1 | 8/2010 |
| WO | WO 2010146074 A1 * | 12/2010 |

OTHER PUBLICATIONS

Dashti et al., "Kinetic and Morphological Investigation on the Magnesium Ethoxide-Based Ziegler-Natta Catalyst for Propylene Polymerization Using Typical External Donors," Macromol. Symp. 2009, 285, 52-57.*
International Search Report mailed May 3, 2012, issued in International Patent Application No. PCT/CN2012/000098.
Written Opinion mailed May 3, 2012, issued in International Patent Application No. PCT/CN2012/000098.
Extended European Search Report dated Jul. 4, 2014, issued in European Patent Application No. 12736394.3, 4 pages.

* cited by examiner

*Primary Examiner* — Ling Choi
*Assistant Examiner* — Catherine S Branch
(74) *Attorney, Agent, or Firm* — Finnegan, Henderson, Farabow, Garrett & Dunner, LLP

(57) ABSTRACT

Disclosed is a solid catalyst component for olefin polymerization. The catalyst component comprises a dialkoxy magnesium carrier, a titanium compound, and a product from an internal electron donor reacting in an inert solvent. The internal electron donor compound comprises a 2,3-di-non-linear-alkyl-2-cyano succinic acid diester compound as presented in formula I.

19 Claims, No Drawings

SOLID CATALYST COMPONENT AND CATALYST FOR OLEFIN POLYMERIZATION

CROSS REFERENCE TO RELATED APPLICATIONS

This application is a national phase application based on PCT/CN2012/000098, filed Jan. 19, 2012, which claims the priority of Chinese Patent Application Nos. 201110021246.3, filed Jan. 19, 2011, 201110021247.8, filed Jan. 19, 2011, 201110021250.X, filed Jan. 19, 2011, the contents of all of which are incorporated herein by reference.

TECHNICAL FIELD

The present invention relates to a solid catalyst component for olefin polymerization and a catalyst thereof, which belongs to the olefin polymerization field.

TECHNICAL BACKGROUND

Ziegler-Natta catalysts comprising titanium compounds and organo-aluminum compounds are generally used to obtain olefin polymers in the olefin polymerization field. For example, in CN85100997A and CN1453298A, it recites using a catalyst in the preparation of polypropylene to obtain a propylene polymer, wherein said catalyst comprises a solid catalyst component, an organo-aluminum compound as a cocatalyst component and an organo-silicon external electron donor compound as an improving agent for stereospecificity, and said solid catalyst component is mainly composed of titanium, magnesium, chlorine and an internal electron donor compound. Currently, the research for catalysts mainly focuses on the following aspects: enhancing the polymerization activity of catalysts, enhancing stereospecificity of polyolefins, improving hydrogen regulation sensitivity of catalysts, improving particle shape of olefin polymers, reducing the residual Cl in the polymers, and so on.

When a supported catalyst component with a dialkoxy magnesium carrier is used, the obtained propylene polymer has the advantages of a good particle shape, small fine powder content and good stereospecificity. In order to obtain a catalyst component with well performance for olefin polymerization, a dialkoxy magnesium carrier with well performance should be first prepared.

There are many researches into using a dialkoxy magnesium carrier to prepare a catalyst component for olefin polymerization. EP0459009 discloses a catalyst component for olefin polymerization, and the preparation thereof comprising dispersing diethoxy magnesium in an alkylbenzene to form a suspension, contacting said suspension with titanium tetrachloride and a phthalyl dichloride at 80-125° C., washing the resultant by an alkylbenzene, and finally obtaining a titanium-containing catalyst component. The catalyst obtained from said catalyst component has high polymerization activity and long-lasting activity, but the obtained propylene polymer has a lower bulk density.

EP 0811639 mainly discloses a solid catalyst component for olefin polymerization, which is prepared by reacting a titanium halide, an aromatic dicarboxylic ester with an alkoxy magnesium. By controlling the indexes such as the bulk density and the average particle shape and controlling the heating rate from the first contacting temperature to the reacting temperature of the titanium halide and the alkoxy magnesium (the heating rate is controlled within 0.5-20° C./min), a solid catalyst component is obtained, and then a polyolefin with high isotacticity and bulk density can be obtained, but he obtained polymer has high fine powder content.

CN 101054424A discloses that, the prepared dialkoxy magnesium is suspended in toluene, and titanium tetrachloride is added after decreasing the temperature of the suspension to 0° C. The temperature of the suspension is risen, and an internal electron donor is added. Toluene is added for washing after full reaction, then toluene and titanium compounds are added for treating, and finally hexane is used for washing. The obtained solid catalyst component has high polymerization activity and good sphercity degree, but the particular size distribution thereof is not concentrated.

In a solid catalyst component for olefin polymerization with magnesium, titanium and internal electron donors as the basic components, an internal electron donor compound is essential for obtaining a polymer with high stereospecificity. The commonly used electron donor compounds disclosed are multi-carboxylic esters. For example, phthalates are disclosed in many patents, the specific compounds being di-n-butyl phthalate, and di-iso-butyl phthalate. When a solid catalyst component obtained from such compounds is used with a cocatalyst component and an external electron donor to form a catalyst, and when said catalyst is used for olefin polymerization, it has high polymerization activity and good polymer stereospecificity, but the obtained polymer has disatisfactory wide molecular weight distribution and poor processability.

SUMMARY OF THE INVENTION

In order to overcome the shortage in the prior art, the present invention provides a solid catalyst component and a catalyst for olefin polymerization. When it is used for olefin polymerization, particularly for propylene polymerization, the obtained polymer has the advantages of wide molecular weight distribution, good stereospecificity, good particle shape, and good processability.

The present invention provides a solid catalyst component for olefin polymerization, said catalyst component comprising a reaction product of a dialkoxy magnesium carrier, a titanium compound and an internal electron donor in an inert solvent, said internal electron donor compound comprising a 2,3-di-non-linear-alkyl-2-cyano succinic acid diester compound as shown in formula

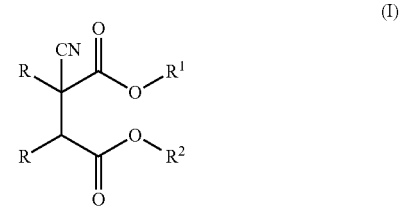

wherein, $R^1$ and $R^2$ are independently selected from linear or branched $C_1$-$C_4$ alkyl groups, R is selected from $C_3$-$C_6$ iso-alkyl, sec-alkyl, or cycloalkyl groups.

The present invention provides another solid catalyst component for olefin polymerization, said catalyst component comprising a reaction product of a dialkoxy magnesium carrier, a titanium compound and an internal electron donor in an inert solvent, said internal electron donor compound comprising a 2,3-di-non-linear-alkyl-2-cyano succinic acid diester compound as shown in formula I 2-isopropyl-2-(3-methylbutyl)-1,3-dimethoxy propane and/or a carboxylic ester compound:

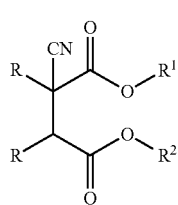

(I)

wherein, $R^1$ and $R^2$ are independently selected from linear or branched $C_1$-$C_4$ alkyl groups, R is selected from $C_3$-$C_6$ iso-alkyl, sec-alkyl, or cycloalkyl groups.

In said solid catalyst component of the present invention, said spherical dialkoxy magnesium is disclosed in CN201010522125.2, the related content therein is incorporated herein for reference.

In said solid catalyst component according to the present invention, said 2,3-di-non-linear-alkyl-2-cyano succinic acid diester compound is prepared by the process as disclosed in PCT/CN2010/000202. The amount of said 2,3-di-non-linear-alkyl-2-cyano succinic acid diester compound is generally 0.005-10 mol, preferably 0.01-1 mol, based on 1 mol of magnesium in the spherical dialkoxy magnesium compound.

In said solid catalyst component according to the present invention, said 2,3-di-non-linear-alkyl-2-cyano succinic acid diester compound can be selected from at least one of the following compounds, 2,3-di-iso-propyl-2-cyano succinic acid dimethyl ester, 2,3-di-iso-propyl-2-cyano succinic acid diethyl ester, 2,3-di-iso-propyl-2-cyano succinic acid di-n-propyl ester, 2,3-di-iso-propyl-2-cyano succinic acid di-iso-propyl ester, 2,3-di-iso-propyl-2-cyano succinic acid di-n-butyl ester, 2,3-di-iso-propyl-2-cyano succinic acid di-iso-butyl ester, 2,3-di-iso-propyl-2-cyano succinic acid 1-methyl-4-ethyl ester ($R^1$ is a methyl group and $R^2$ is an ethyl group), 2,3-di-iso-propyl-2-cyano succinic acid 1-ethyl-4-methyl ester ($R^1$ is an ethyl group and $R^2$ is a methyl group), 2,3-di-iso-propyl-2-cyano succinic acid 1-n-butyl-4-ethyl ester ($R^1$ is an n-butyl group and $R^2$ is an ethyl group), 2,3-di-iso-propyl-2-cyano succinic acid 1-ethyl -4-n-butyl ester ($R^1$ is an ethyl group and $R^2$ is an n-butyl group), 2,3-di-iso-butyl-2-cyano succinic acid dimethyl ester, 2,3-di-iso-butyl-2-cyano succinic acid diethyl ester, 2,3-di-iso-butyl-2-cyano succinic acid di-n-propyl ester, 2,3-di-iso-butyl-2-cyano succinic acid di-iso-propyl ester, 2,3-di-iso-butyl-2-cyano succinic acid di-n-butyl ester, 2,3-di-iso-butyl-2-cyano succinic acid di-iso-butyl ester, 2,3-di-iso-butyl-2-cyano succinic acid 1-methyl-4-ethyl ester ($R^1$ is a methyl group and $R^2$ is an ethyl group), 2,3-di-iso-butyl-2-cyano succinic acid 1-ethyl-4-methyl ester ($R^1$ is an ethyl group and $R^2$ is a methyl group), 2,3-di-iso-butyl-2-cyano succinic acid 1-n-butyl-4-ethyl ester ($R^1$ is an n-butyl group and $R^2$ is an ethyl group), 2,3-di-iso-butyl-2-cyano succinic acid 1-ethyl -4-n-butyl ester ($R^1$ is an ethyl group and $R^2$ is an n-butyl group), 2,3-di-sec-butyl-2-cyano succinic acid dimethyl ester, 2,3-di-sec-butyl-2-cyano succinic acid diethyl ester, 2,3-di-sec-butyl-2-cyano succinic acid di-n-propyl ester, 2,3-di-sec-butyl-2-cyano succinic acid di-iso-propyl ester, 2,3-di-sec-butyl-2-cyano succinic acid di-n-butyl ester, 2,3-di-sec-butyl-2-cyano succinic acid di-iso-butyl ester, 2,3-di-sec-butyl-2-cyano succinic acid 1-methyl-4-ethyl ester ($R^1$ is a methyl group and $R^2$ is an ethyl group), 2,3-di-sec-butyl-2-cyano succinic acid 1-ethyl-4-methyl ester ($R^1$ is an ethyl group and $R^2$ is a methyl group), 2,3-di-sec-butyl-2-cyano succinic acid 1-n-butyl-4-ethyl ester ($R^1$ is an n-butyl group and $R^2$ is an ethyl group), 2,3-di-sec-butyl-2-cyano succinic acid 1-ethyl-4-n-butyl ester ($R^1$ is an ethyl group and $R^2$ is an n-butyl group), 2,3-di-cyclopentyl-2-cyano succinic acid dimethyl ester, 2,3-di-cyclopentyl-2-cyano succinic acid diethyl ester, 2,3-di-cyclopentyl-2-cyano succinic acid di-n-propyl ester, 2,3-di-cyclopentyl-2-cyano succinic acid di-iso-propyl ester, 2,3-di-cyclopentyl-2-cyano succinic acid di-n-butyl ester, 2,3-di-cyclopentyl-2-cyano succinic acid di-iso-butyl ester, 2,3-di-cyclopentyl-2-cyano succinic acid 1-methyl-4-ethyl ester ($R^1$ is a methyl group and $R^2$ is an ethyl group), 2,3-di-cyclopentyl-2-cyano succinic acid 1-ethyl-4-methyl ester ($R^1$ is an ethyl group and $R^2$ is a methyl group), 2,3-di-cyclopentyl-2-cyano succinic acid 1-n-butyl-4-ethyl ester ($R^1$ is an n-butyl group and $R^2$ is an ethyl group), 2,3-di-cyclopentyl-2-cyano succinic acid 1-ethyl -4-n-butyl ester ($R^1$ is an ethyl group and $R^2$ is an n-butyl group), 2,3-di-cyclohexyl-2-cyano succinic acid dimethyl ester, 2,3-di-cyclohexyl-2-cyano succinic acid diethyl ester, 2,3-di-cyclohexyl-2-cyano succinic acid di-n-propyl ester, 2,3-di-cyclohexyl-2-cyano succinic acid di-iso-propyl ester, 2,3-di-cyclohexyl-2-cyano succinic acid di-n-butyl ester, 2,3-di-cyclohexyl-2-cyano succinic acid di-iso-butyl ester, 2,3-di-cyclohexyl-2-cyano succinic acid 1-methyl-4-ethyl ester ($R^1$ is a methyl group and $R^2$ is an ethyl group), 2,3-di-cyclohexyl-2-cyano succinic acid 1-ethyl-4-methyl ester ($R^1$ is an ethyl group and $R^2$ is a methyl group), 2,3-di-cyclohexyl-2-cyano succinic acid 1-n-butyl-4-ethyl ester ($R^1$ is an n-butyl group and $R^2$ is an ethyl group) and 2,3-di-cyclohexyl-2-cyano succinic acid 1-ethyl -4-n-butyl ester ($R^1$ is an ethyl group and $R^2$ is an n-butyl group). Preferably, 2,3-di-non-linear-alkyl-2-cyano succinic acid diester compound is selected from 2,3-di-iso-propyl-2-cyano succinic acid diethyl ester, 2,3-di-iso-propyl-2-cyano succinic acid di-n-propyl ester, 2,3-di-iso-propyl-2-cyano succinic acid di-iso-propyl ester, 2,3-di-iso-propyl-2-cyano succinic acid di-n-butyl ester and 2,3-di-iso-propyl-2-cyano succinic acid di-iso-butyl ester. In a specific example, said 2,3-di-non-linear-alkyl-2-cyano succinic acid diester compound is 2,3-di-iso-propyl-2-cyano succinic acid diethyl ester.

In said solid catalyst component according to the present invention, 2-isopropyl-2-(3-methylbutyl)-1,3-dimethoxy propane is prepared by the method disclosed in ZL91108297.2. Generally, the amount of 2-isopropyl-2-(3-methylbutyl)-1,3-dimethoxy propane is 0.005-10 mol, preferably 0.01-1 mol, based on 1 mol of magnesium in the spherical dialkoxy magnesium compound.

In said solid catalyst component of the present invention, said carboxylic ester compounds can be selected from aliphatic or aromatic monocarboxylic alkyl esters, aliphatic or aromatic polycarboxylic alkyl esters, aliphatic ethers, cyclic aliphatic ethers and/or aliphatic ketones. Based on 1 mol of magnesium in said dialkoxy magnesium, said carboxylic eater compound has an amount of 0.005-10 mol, preferably 0.01-1 mol. Said carboxylic acid ester compound can be preferably selected from $C_1$-$C_4$ saturated aliphatic carboxylic alkyl esters, $C_7$-$C_8$ aromatic carboxylic alkyl esters, $C_2$-$C_6$ aliphatic ethers, $C_3$-$C_4$ cyclic ethers and $C_3$-$C_6$ saturated aliphatic ketones. The carboxylic ester compounds specifically comprise methyl formate, ethyl acetate, butyl acetate, di-iso-butyl phthalate, di-n-butyl phthalate and, di-iso-octyl phthalate, 1,3-diamyl benzene dicarboxylic ester, ethyl ether, hexyl ether, tetrahydrofuran (THF), acetone and methyl isobutyl ketone, preferably selected from di-n-butyl phthalate, di-iso-butyl phthalate and 1,3-diamyl benzene dicarboxylic ester. Said carboxylic ester electron donor compounds can be used alone or cooperatively.

In said solid catalyst component of the present invention, said titanium compound has a formula of $Ti(OR)_{4-n}X_n$, wherein R, which can be the same to or different from one another, can be $C_1$-$C_{14}$ aliphatic hydroxyl groups or aromatic hydroxyl groups, X is a halogen atom, and n is an integer from 0-4. X is preferably a chlorine or bromine atom, more preferably a chlorine atom. R can be saturated or unsaturated groups, straight chain or branched chain groups, or cyclic groups, preferably alkyl, alkenyl, cycloalkenyl or aralkyl groups, and more preferably straight chain or branched chain alkyl groups. When multiple Rs exist, they can be the same to or different from each other. The specific examples of R can be selected from a methyl group, an ethyl group, an n-propyl group, an iso-propyl group, an allyl group, an n-butyl group, a sec-butyl group, an isobutyl group, an n-amyl group, an n-hexyl group, an n-heptyl group, an n-octyl group, an n-decyl group, an allyl group, a butenyl group, a cyclopentyl group, a cyclohexyl group, a cyclohexenyl group, a phenyl group, a tolyl group, a benzyl group, a phenethyl group and so on. The specific examples of titanium compounds comprise but are not limited to, tetraalkoxy titaniums such as tetramethoxy titanium, tetraethoxy titanium, tetra-n-propoxy titanium, tetra-iso-propoxy titanium, tetra-n-butoxy titanium, tetra-iso-butoxy titanium, tetracyclohexyloxy titanium and tetraphenoxy titanium, titanium tetrahalides such as titanium tetrachloride, titanium tetrabromide and titanium tetraiodide, alkoxy titanium trihalides such as methoxy titanium trichloride, ethoxy titanium trichloride, propoxy titanium trichloride, n-butoxy titanium trichloride and ethoxy titanium tribromide, dialkoxy titanium dihalides such as dimethoxy titanium dichloride, diethoxy titanium dichloride, di-n-propoxy titanium dichloride, di-iso-propoxy titanium dichloride and diethoxy titanium dibromide, and trialkoxy titanium halides such as trimethoxy titanium chloride, triethoxy titanium chloride, tri-n-propoxy titanium chloride, tri-iso-propoxy titanium chloride, wherein titanium tetrahalide is preferred. In a specific example, said titanium compound is titanium tetrachloride. The amount of said titanium compound is 0.5-100 mol, preferably 1-50 mol, based on 1 mol of magnesium in said spherical dialkoxy magnesium.

In said solid catalyst component of the present invention, said inert solvent can be one or more of hexane, heptane, octane, decane, benzene, toluene and xylene. The amount of said inert solvent is 0.5-100 mol, preferably 1-50 mol, based on 1 mol of magnesium in said spherical dialkoxy magnesium. In a specific example, said inert solvent is toluene.

In a specific example of said solid catalyst component in the present invention, the spherical dialkoxy magnesium as a carrier contacts with a 2,3-di-non-linear-alkyl-2-cyano succinic acid diester internal electron donor compound as shown in formula I in an inert solvent as a dispersant. The resultant is then reacted with a titanium compound, and treated with a titanium compound, and finally said solid catalyst component can be obtained.

In said solid catalyst component of the present invention, the contacting temperature or reacting temperature between and among the components is generally −40-200° C., preferably −20-150° C. The contacting time or reacting time is generally 1 min-20 h, preferably 5 min-8 h. There is no special limitation on the contacting order of each component. For example, the components can contact with one another in the presence of an inert dilute or after being separately diluted by the inert solvent. There is no special limitation on contacting times as well, which can be once or many times.

The solid catalyst component obtained from the above reaction can be washed by an inert solvent. For example, one or more selected from hexane, heptane, octane, decane, benzene, toluene and xylene can be used. Hexane is preferred for washing in the present invention. There is no special limitation on washing methods, but decantation, distillation, etc. are preferred. There is no special limitation on the amount of the inert solvent, washing time or washing times. In general, based on 1 mol of a magnesium compound, 1-1000 mol, preferably 10-500 mol of a solvent is used for washing for 1-20 h, preferably 6-10 h. In addition, taking the homogeneity and the efficiency of washing into account, it is preferred to stir the solution during the washing operation. It should be noted that the obtained solid catalyst component can be saved under a dry state or in an inert solvent.

The present invention also provides a catalyst for olefin polymerization, said catalyst comprising a reaction product of the following components:
  a. the above solid catalyst component;
  b. an organo-aluminum compound with a formula of $AlR_nX_{3-n}$, wherein R is a hydrogen atom or a $C_1$-$C_{20}$ hydrocarbyl group, X is a halogen atom, 0<n≤3, and n is an integer; and
  c. optionally, an organo-silicon compound with a formula of $R_1R_2Si(OR')_2$, wherein $R_1$ and $R_2$, the same to or different from each other, can be $C_1$-$C_{20}$ alkyl groups, $C_3$-$C_{20}$ cycloalkyl groups or $C_3$-$C_{20}$ aryl groups, and R' is a $C_1$-$C_4$ alkyl group.

In the above catalyst, the ratio of component b to component a is 5-5000 based on the molar ratio of aluminum to titanium, and the ratio of component b to component c is 5-30 based on the molar ratio of aluminum to silicon. Preferably, the ratio of component b to component a is 20-500 based on the molar ratio of aluminum to titanium.

In the above catalyst, the specific examples of said organo-silicon compound comprise but are not limited to, tri-methyl aluminum, tri-ethyl aluminum, tri-iso-butyl aluminum, tri-octyl aluminum and alkyl aluminum halides such as diethyl aluminum chloride, di-iso-butyl aluminum chloride and ethyl aluminum dichloride, wherein tri-ethyl aluminum or tri-iso-butyl aluminum is preferred.

In the above catalyst, the specific examples of said organo-silicon compound comprise but are not limited to tri-methyl methoxy silane, tri-methyl ethoxy silane, tri-methyl phenoxy silane, di-methyl di-methoxy silane, di-methyl di-ethoxy silane, methyl cyclohexyl di-ethoxy silane, methyl cyclohexyl di-methoxy silane, di-phenyl di-methoxy silane, di-phenyl di-ethoxy silane, phenyl tri-ethoxy silane, phenyl tri-methoxy silane, vinyl tri-methoxy silane, and so on.

The present invention also provides a process for olefin polymerization, and said olefin is polymerized in the presence of the above solid catalyst component or the above catalyst. Said olefin is preferably propylene.

The solid catalyst provided by the present invention is used to prepare a catalyst. When the obtained catalyst is used for olefin polymerization, particularly for propylene polymerization, it has good polymerization activity. Meanwhile, the obtained polymer has the advantages of wide molecular weight distribution, good particle shape, uniform particle distribution and low fine powder content. As the polymer prepared by the catalyst provided by the present invention has good processability, the catalyst is particularly suitable for the product which has high processability requirement for polymers.

Embodiment

The present invention will be further described but will not be limited by the following examples.

Evaluation process for polyolefins:
  (1) the titanium content in the catalyst is measured by 721 spectrophotometer;
  (2) isotacticity (II) of a polymer is measured by the method of extraction with boiling n-heptane;

(3) melting index (MI) of a polymer is measured according to GB/T3682-2000;
(4) the particular size and particular size distribution of dialkoxy magnesium and catalysts are measured by Malvern Mastersizer™2000 Laser diffraction methods using n-hexane as a dispersant;
(5) the bulk density is measured by the method of loose solid weight for unit volume.

The Preparation of Compounds 1. the preparation of 2,3-di-iso-propyl-2-cyano succinic acid diethyl ester It is prepared according to the method disclosed in Example 1 of PCT/CN2010/000202. The amounts of the reactants and the solvent are 10 times of the amounts of those in Example 1 of PCT/CN2010/000202, and the separation and purification of 2,3-di-iso-propyl-2-cyano succinic acid diethyl ester crude product is changed from a chromatographic column with silica-gel to distillation under reduced pressure, and the fractions at 124-127° C. under 110-120 Pa are collected. The infrared analysis result of the product is the same as 2,3-di-iso-propyl-2-cyano succinic acid diethyl ester in Example 1 of PCT/CN2010/000202, hereafter referred to as JS-1.

IR ($cm^{-1}$): 2979, 2881, 2246, 1733, 1469, 1394, 1371, 1299.6, 1141.

2. The preparation of 2-iso-propyl-2-(3-methylbutyl)-1,3-dimethoxy propane

It is prepared according to the method disclosed in ZL91108297.2, and is referred to as ether-1.

The Catalyst Component and the Catalyst

EXAMPLE 1

(1) The Preparation of the Catalyst Component 10 g of diethoxy magnesium ($d_{0.5}$ is 26.4 µm, and the value of Span is 0.85), 50 ml of toluene and 3.0 ml of the above prepared 2,3-di-iso-propyl-2-cyano succinic acid diethyl ester (which is referred to as JS-1 in Table 1) are selected to prepare a suspension. Into a 300 ml reactor in which gas is replaced repeatedly by high purity nitrogen, 10 ml of toluene and 90 ml of titanium tetrachloride are added. After the temperature of the mixture of toluene and titanium tetrachloride is increased to 80° C., the prepared suspension is added into said reactor. After the temperature of the mixture in the reactor is maintained for 1 h, the temperature is increased to 110° C., and the liquid in the reactor is filtered under pressure after the temperature is maintained at 110° C. for 2 h. A mixture of 120 ml of toluene and 30 ml of titanium tetrachloride are added, and stirred for 1 h at 110° C. Such treatment is repeated for 3 times, and the liquid is separated. The obtained solid is washed by 150 ml of hexane for 4 times. The liquid is separated, and a solid catalyst component can be obtained after being dried. The data of the solid catalyst component are shown in Table 1.

(2) Olefin Polymerization

Propylene is used as the olefin and is polymerized according to the following steps.

Into a 5 L steel autoclave equipped with a stirrer, in which gas is replaced with nitrogen, 5 ml solution of triethyl aluminum in hexane (the concentration of triethyl aluminum is 0.5 mmol/ml), 1 ml solution of cyclohexyl methyl dimethoxy silane (CHMMS) in hexane (the concentration of CHMMS is 0.10 mmol/ml), 10 ml of anhydrous hexane and 10 mg of the solid catalyst component are introduced under nitrogen. After the autoclave is closed, 1 L of hydrogen (standard state) and 2.0 L of liquid propylene are introduced, and the temperature therein is increased to 70° C. within 10 min under stirring. After the polymerization reaction is carried out for 2 h at 70° C., the stirring is stopped, the unpolymerized propylene monomer is removed, and the polymer is collected. The data are shown in Table 1.

EXAMPLE 2

The steps are similar to those in Example 1, except that the adding amount of 2,3-di-iso-propyl-2-cyano succinic acid diethyl ester referred to as JS-1 is 4.5 ml. The specific data are shown in Table 1.

EXAMPLE 3

The steps are similar to those in Example 1, except that 2,3-di-iso-propyl-2-cyano succinic acid diethyl ester referred to as JS-1 has an adding amount of 2.0 ml. The specific data are shown in Table 1.

EXAMPLE 4

The steps are similar to those in Example 1, except that 4.5 L of hydrogen (standard state) is introduced during the olefin polymerization process. The specific data are shown in Table 1.

EXAMPLE 5

The steps are similar to those in Example 2, except that 4.5 L of hydrogen (standard state) is introduced during the olefin polymerization process. The specific data are shown in Table 1.

EXAMPLE 6

The steps are similar to those in Example 3, except that 4.5 L of hydrogen (standard state) is introduced during the olefin polymerization process. The specific data are shown in Table 1.

EXAMPLE 7

The steps are similar to those in Example 4, except that 1.25 ml of 2,3-di-iso-propyl-2-cyano succinic acid diethyl ester (JS-1) and 1.25 ml of 2-iso-propyl-2-(3-methylbutyl)-1,3-dimethoxy propane (ether-1) are added to prepare a suspension. The specific data are shown in Table 1.

EXAMPLE 8

The steps are similar to those in Example 7, except that 2,3-di-iso-propyl-2-cyano succinic acid diethyl ester (JS-1) has an amount of 1.9 ml, and 2-iso-propyl-2-(3-methylbutyl)-1,3-dimethoxy propane (ether-1) has an amount of 0.6 ml. The specific data are shown in Table 1.

EXAMPLE 9

The steps are similar to those in Example 7, except that 2,3-di-iso-propyl-2-cyano succinic acid diethyl ester (JS-1) has an amount of 0.6 ml, and 2-iso-propyl-2-(3-methylbutyl)-1,3-dimethoxy propane (ether-1) has an amount of 1.9ml. The specific data are shown in Table 1.

EXAMPLE 10

The steps are similar to those in Example 4, except that 0.6 ml of 2,3-di-iso-propyl-2-cyano succinic acid diethyl ester (JS-1) and 1.9 ml of di-n-butyl phthalate (DNBP) are added to prepare a suspension. The specific data are shown in Table 1.

EXAMPLE 11

The steps are similar to those in Example 4, except that 0.6 ml of 2,3-di-iso-propyl-2-cyano succinic acid diethyl ester (JS-1), 1.9 ml of di-n-butyl phthalate (DNBP) and 0.6 ml of 2-iso-propyl-2-(3-methylbutyl)-1,3-dimethoxy propane (ether-1) are added to prepare a suspension. The specific data are shown in Table 1.

EXAMPLE 12

The steps are similar to those in Example 11, except that 0.9 ml of 2,3-di-iso-propyl-2-cyano succinic acid diethyl ester (JS-1) and 0.3 ml of 2-iso-propyl-2-(3-methylbutyl)-1,3-dimethoxy propane (ether-1) are added to prepare a suspension. The specific data are shown in Table 1.

EXAMPLE 13

The steps are similar to those in Example 11, except that 0.3 ml of 2,3-di-iso-propyl-2-cyano succinic acid diethyl ester (JS-1) and 0.9 ml of 2-iso-propyl-2-(3-methylbutyl)-1,3-dimethoxy propane (ether-1) are added to prepare a suspension. The specific data are shown in Table 1.

late are used to prepare a suspension. Into a 300 ml reactor in which gas is repeatedly replaced by high purity nitrogen, 10 ml of toluene and 90 ml of titanium tetrachloride are added. After the temperature in the reactor is increased to 80° C., the prepared suspension is added into said reactor. After the temperature is maintained for 1 h, the temperature is increased to 115° C., and the liquid is filtered under pressure after said temperature is maintained for 2 h. A mixture of 120 ml of toluene and 30 ml of titanium tetrachloride are added, and stirred for 1 h at 110° C. Such treatment is repeated for 3 times, and the liquid is separated. The obtained solid is washed by 150 ml of hexane for 4 times. The liquid is separated, and a solid catalyst component can be obtained after being dried. The data are shown in Table 1.

(2) Olefin Polymerization

The steps are similar to those in Example 4. The specific data are shown in Table 1.

It can be seen from Table 1 that, the catalyst obtained in the present invention has good activity, and the obtained polymer has wide molecular weight distribution, good stereospecificity, low fine powder content, and good processability because of the wide molecular weight distribution.

TABLE 1

| Item Num. | Internal electron donor Type | Adding amount ml | Catalyst component Ti (%) | Particle size distribution d(0.1) μm | d(0.5) μm | d(0.9) μm | Span | Propylene polymerization evaluation Activity (Kg/g cat.) | MWD | BD (g/cm$^3$) | MI (g/10 min) | II (%) | Polymer fine powder content <0.18 μm (%) |
|---|---|---|---|---|---|---|---|---|---|---|---|---|---|
| Example 1 | JS-1 | 3.0 | 3.16 | 16.6 | 24.4 | 37.5 | 0.86 | 35.1 | 12.3 | 0.43 | 0.33 | 98.2 | 0.3 |
| Example 2 | JS-1 | 4.5 | 3.26 | 15.2 | 22.3 | 36.9 | 0.97 | 36.0 | 12.9 | 0.43 | 0.28 | 98.7 | 0.5 |
| Example 3 | JS-1 | 2.0 | 2.93 | 16.9 | 25.1 | 38.2 | 0.85 | 34.8 | 11.7 | 0.43 | 0.52 | 98.0 | 0.2 |
| Example 4 | JS-1 | 3.0 | 3.16 | 16.6 | 24.4 | 37.5 | 0.86 | 29.6 | 12.1 | 0.43 | 6.15 | 97.3 | 0.3 |
| Example 5 | JS-1 | 4.5 | 3.26 | 15.2 | 22.3 | 36.9 | 0.97 | 30.8 | 12.5 | 0.43 | 5.50 | 97.6 | 0.5 |
| Example 6 | JS-1 | 2.0 | 2.93 | 16.9 | 25.1 | 38.2 | 0.85 | 28.9 | 11.2 | 0.43 | 9.12 | 96.2 | 0.2 |
| Example 7 | JS-1 Ether-1 | 1.25 1.25 | 3.38 | 16.2 | 24.4 | 37.2 | 0.86 | 49.0 | 7.5 | 0.46 | 29.1 | 96.3 | 0.3 |
| Example 8 | JS-1 Ether-1 | 1.9 0.6 | 3.15 | 17.0 | 25.2 | 39.1 | 0.88 | 45.1 | 8.3 | 0.45 | 26.5 | 96.0 | 0.4 |
| Example 9 | JS-1 Ether-1 | 0.6 1.9 | 3.53 | 16.7 | 24.8 | 38.3 | 0.87 | 52.2 | 6.8 | 0.46 | 35.2 | 95.8 | 0.3 |
| Example 10 | DNBP JS-1 | 1.9 0.6 | 3.34 | 14.9 | 25.2 | 39.4 | 0.97 | 62.4 | 8.2 | 0.43 | 24.51 | 92.9 | 0.6 |
| Example 11 | DNBP JS-1 Ether-1 | 1.9 0.6 0.6 | 3.51 | 13.6 | 23.6 | 34.8 | 0.90 | 61.5 | 8.0 | 0.43 | 22.6 | 95.5 | 0.4 |
| Example 12 | DNBP JS-1 Ether-1 | 1.9 0.9 0.3 | 3.15 | 17.0 | 25.2 | 39.1 | 0.88 | 59.1 | 8.5 | 0.43 | 20.7 | 96.3 | 0.5 |
| Example 13 | DNBP JS-1 Ether-1 | 1.9 0.3 0.9 | 3.53 | 16.7 | 24.8 | 38.3 | 0.87 | 63.6 | 7.6 | 0.44 | 25.8 | 95.2 | 0.5 |
| Comparative Example 1 | DNBP | 2.5 | 2.52 | 16.5 | 25.2 | 38.6 | 0.88 | 53.5 | 5.7 | 0.43 | 21.25 | 96.2 | 0.5 |

COMPARATIVE EXAMPLE 1

(1) The Preparation of the Catalyst Component 10 g of diethoxy magnesium having the same size as that in Example 4, 50 ml of toluene and 2.5 ml of di-n-butyl phtha-

The invention claimed is:

1. A solid catalyst component for olefin polymerization, said catalyst component comprising a reaction product of a dialkoxy magnesium carrier, a titanium compound and an internal electron donor in an inert solvent, said internal electron donor compound comprising a 2,3-di-non-linear-alkyl-2-cyano succinic acid diester compound as shown in formula I:

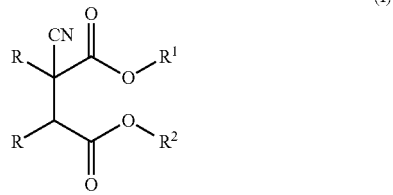

wherein, $R^1$ and $R^2$ radicals are independently chosen from linear or branched $C_1$-$C_4$ alkyl groups, R is chosen from $C_3$-$C_6$ iso-alkyl, sec-alkyl, and cycloalkyl groups.

2. The solid catalyst component according to claim 1, wherein said internal electron donor compound further comprises 2-isopropyl-2-(3-methylbutyl)-1,3-dimethoxy propane and/or a carboxylic ester compound.

3. The solid catalyst component according to claim 1, wherein said 2,3-di-non-linear-alkyl-2-cyano succinic acid diester compound is selected from 2,3-di-iso-propyl-2-cyano succinic acid diethyl ester, 2,3-di-iso-propyl-2-cyano succinic acid din-propyl ester, 2,3-di-iso-propyl-2-cyano succinic acid di-iso-propyl ester, 2,3-di-iso-propyl-2-cyano succinic acid di-n-butyl ester and 2,3-di-iso-propyl-2-cyano succinic acid di-iso-butyl ester.

4. The solid catalyst component according to claim 3, wherein said 2,3-di-non-linear-alkyl-2-cyano succinic acid diester compound is 2,3-di-iso-propyl-2-cyano succinic acid diethyl ester.

5. The solid catalyst component according to claim 1, wherein said titanium compound has a formula of $Ti(OR)_{4-n}X_n$, wherein R, which can be the same to or different from one another, can be $C_1$-$C_{14}$ aliphatic hydrocarbyl groups or aromatic hydrocarbyl groups, X is a halogen atom, and N is an integer from 0-4.

6. The solid catalyst component according to claim 1, wherein said titanium compound is titanium tetrachloride, and said inert solvent is toluene.

7. The solid catalyst component according to claim 1, wherein based on 1 mol of magnesium in said dialkoxy magnesium, the amount of said 2,3-di-non-linear-alkyl-2-cyano succinic acid diester compound is 0.005-10mol, the amount of said titanium compound is 0.5-100mol, and the amount of said inert solvent is 0.5-100mol.

8. The solid catalyst component according to claim 7, wherein based on 1 mol of magnesium in said dialkoxy magnesium, said 2,3-di-non-linear-alkyl-2-cyano succinic acid diester compound has an amount of 0.01-1mol, said titanium compound has an amount of 1-50mol, and said inert solvent has an amount of 1-50mol.

9. The solid catalyst component according to claim 2, wherein based on 1 mol of magnesium in said dialkoxy magnesium, 2-isopropyl-2-(3-methylbutyl)-1,3-dimethoxy propane has an amount of 0.005-10mol.

10. The solid catalyst component according to claim 9, wherein based on 1 mol of magnesium in said dialkoxy magnesium, 2-isopropyl-2-(3-methylbutyl)-1,3-din ethoxy propane has an amount of 0,01-1 mol.

11. The solid catalyst component according to claim 2, wherein said carboxylic acid compound is selected from aliphatic or aromatic mononocarboxylic alkyl esters, aliphatic or aromatic polycarboxyl c alkyl esters, aliphatic ethers, cyclic aliphatic ethers and/or aliphatic ketones.

12. The solid catalyst component according to claim 11 wherein said carboxylic acid compound is selected from $C_1$-$C_4$ saturated aliphatic carboxylic alkyl esters, $C_7$-$C_8$ aromatic carboxylic alkyl esters, $C_2$-$C_6$ aliphatic ethers, $C_3$-C4 cyclic ethers and $C_3$-$C_6$ saturated aliphatic ketones.

13. The solid catalyst component according to claim 12, wherein said carboxylic acid compound is selected from di-n-butyl phthalate, di-iso-butyl phthalate and 1,3-diamyl benzene dicarboxylic ester.

14. The solid catalyst component according to claim 2, wherein based on 1 mol of magnesium in said dialkoxy magnesium, said carboxylic ester compound has an amount of 0.005-10mol.

15. The solid catalyst component according to claim 14, wherein based on 1 mol of magnesium in said dialkoxy magnesium, said carboxylic ester compound has an amount of 0.01-1mol.

16. A catalyst for olefin polymerization, said catalyst comprising a reaction product of the following components:
   a. said solid catalyst component according to claim 1;
   b. an organo-aluminum compound with a formula of $AlR_nX_{3-n}$, wherein, R is a hydrogen atom or a $C_1$-$C_{20}$ hydrocarbyl group, X is a halogen atom, $0<n\leq3$, and n is an integer; and
   c. optionally, an organo-silicon compound with a formula of $R_1R_2Si(OR')_2$,
wherein $R_1$ and $R_2$, which are the same to or different from each other, are $C_1$-$C_{20}$ alkyl groups, $C_3$-$C_{20}$ cycloalkyl groups or $C_3$-$C_{20}$ aryl groups, and R' is a $C_1$-$C_4$ alkyl group.

17. The catalyst according to claim 16, wherein the ratio of component b to component a is 5-5000 based on the molar ratio of aluminum to titanium, and the ratio of component b to component c is 5-30 based on the molar ratio of aluminum to silicon.

18. A process for olefin polymerization, said olefin being polymerized in the presence of said solid catalyst component according to claim 1.

19. A process for olefin polymerization, said olefin being polymerized in the presence of said catalyst according to claim 16.

* * * * *